United States Patent
Tang et al.

(10) Patent No.: US 10,652,770 B2
(45) Date of Patent: May 12, 2020

(54) SHARED EXPERIMENT CONTROL

(71) Applicant: Walmart Apollo, LLC, Bentonville, AR (US)

(72) Inventors: Anthony Tang, San Diego, CA (US); Stephen Bitondo, Carlsbad, CA (US); Shriram Sharma, San Diego, CA (US); Duy Le, San Diego, CA (US); Girish Subramanian, San Diego, CA (US); Swetharam Kasireddi, Santa Clara, CA (US)

(73) Assignee: Walmart Apollo, LLC, Bentonville, AR (US)

(*) Notice: Subject to any disclaimer, the term of this patent is extended or adjusted under 35 U.S.C. 154(b) by 171 days.

(21) Appl. No.: 15/882,942

(22) Filed: Jan. 29, 2018

(65) Prior Publication Data

US 2019/0239103 A1    Aug. 1, 2019

(51) Int. Cl.
*H04W 24/08* (2009.01)
*H04W 72/04* (2009.01)
(Continued)

(52) U.S. Cl.
CPC ....... *H04W 24/08* (2013.01); *H04W 28/0215* (2013.01); *H04W 28/16* (2013.01); *H04W 72/0493* (2013.01)

(58) Field of Classification Search
CPC ..... H04L 67/02; H04L 67/28; H04L 67/2852; H04L 67/2847; H04L 47/70; H04L 67/306; H04L 67/10; H04L 12/4641; H04L 61/1511; H04L 67/04; H04L 1/0007; H04L 1/165; H04L 1/1809; H04L 25/14; H04L 29/12066; H04L 41/0893; H04L 47/283; H04L 47/29; H04L 47/30; H04L 47/762; H04L 47/803; H04L 47/824; H04L 63/0272; H04L 63/1466; H04L 63/1483; H04L 67/125; H04L 67/42; H04L 69/04; H04L 12/2898; H04L 12/6418; H04L 12/66; H04L 1/004; H04L 41/00; H04L 41/0816; H04L 41/142; H04L 43/0817;
(Continued)

(56) References Cited

U.S. PATENT DOCUMENTS

| 7,073,121 B2* | 7/2006 | Brown | G06F 16/954 715/205 |
| 2011/0149737 A1* | 6/2011 | Muthiah | G06F 9/5011 370/235 |
| 2017/0006611 A1* | 1/2017 | Van Phan | H04W 72/005 |

* cited by examiner

*Primary Examiner* — Djenane M Bayard
(74) *Attorney, Agent, or Firm* — Duane Morris LLP; Manita Rawat

(57) ABSTRACT

Systems and methods for providing a shared control group are disclosed. A request for a page is received and each user device is assigned to a shared control pool or one of a plurality of experiments. The shared control pool includes a first percentage of user devices and each of the experiments includes an experimental percentage. For each user device in the shared control pool, a base version of each element is transmitted; for each user device in a first experiment, a first variant element is transmitted; and for each user device assigned to a second experiment a second variant element is transmitted. A record indicative of interactions that occur after transmission is received and the interactions of a first subset of the shared control pool is compared with the devices assigned to the first experiment and a second subset is compared to the devices assigned to the second experiment.

20 Claims, 6 Drawing Sheets

(51) Int. Cl.
*H04W 28/02* (2009.01)
*H04W 28/16* (2009.01)

(58) Field of Classification Search
CPC . H04L 43/0823; H04L 43/0876; H04L 43/10;
H04L 43/14; H04L 45/22; H04L 45/74;
H04L 63/0245; H04L 63/0263; H04L
63/0281; H04L 63/08; H04L 69/18; H04L
67/2842; H04L 67/2819; H04L 67/22;
H04L 67/20; H04L 67/1008; H04L
63/205; H04L 63/166; H04L 63/1475;
H04L 63/0815; H04L 43/12; G06F
3/04842; G06F 2203/0381; G06F
2203/04807; G06F 3/0482; G06F
3/04883; G06F 2203/04803; G06F
2203/04808; G06F 3/04845; G06F
3/0488; G06F 3/04886; G06F 3/167;
G06F 3/14; G06F 16/9574; G06F 16/958;
G06F 2009/45583; G06F 3/048; G06F
12/00; G06F 12/0862
See application file for complete search history.

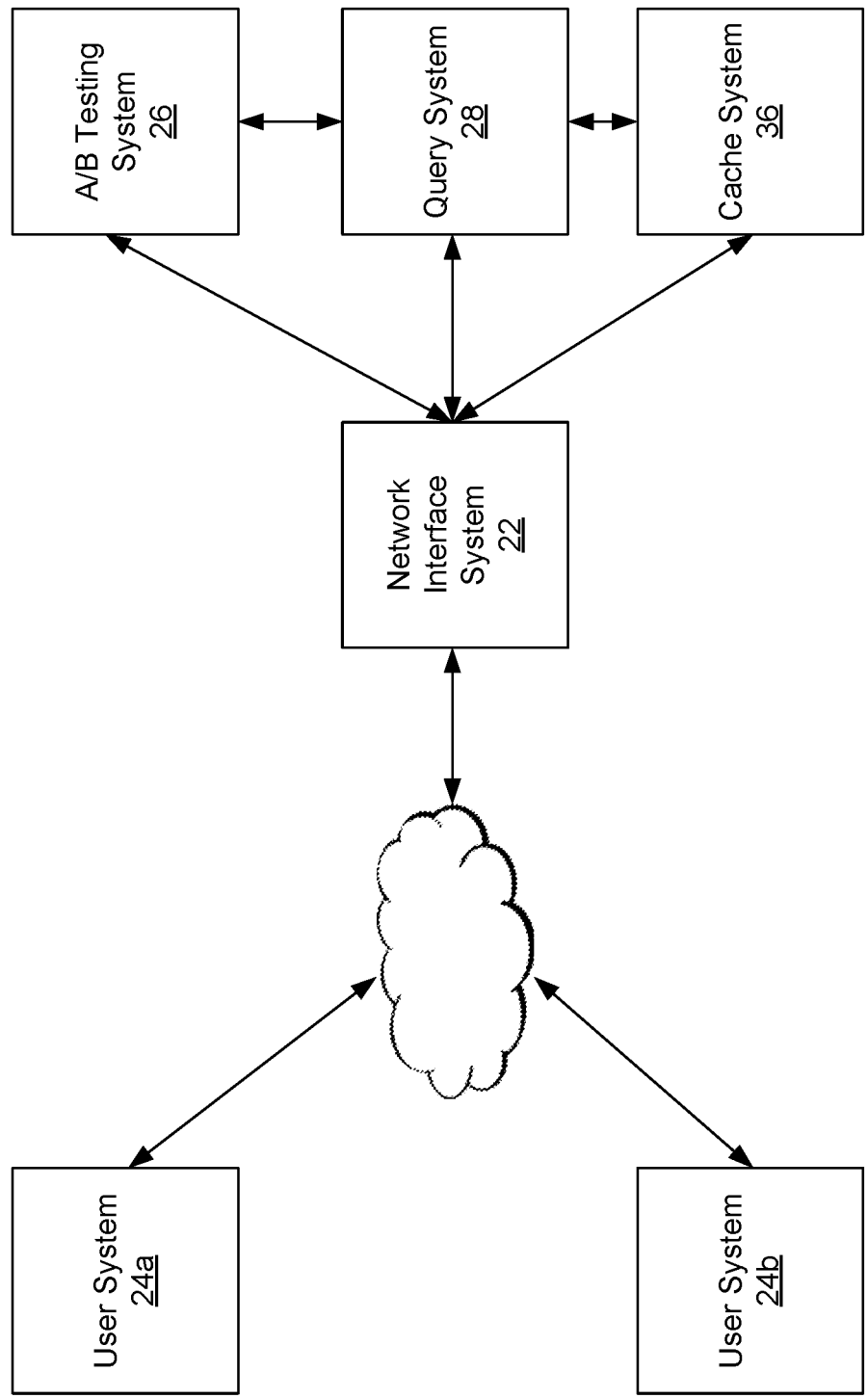

| Experiment 1 Control 102a | Experiment 1 Variant 104a | Experiment 2 Control 102b | Experiment 2 Variant 104b | Experiment 3 Control 102c | Experiment 3 Variant 104c | Experiment 4 Control 102d | Experiment 4 Variant 104d | Experiment 5 Control 102e | Experiment 5 Variant 104d |

FIG. 3A

| Shared Control Pool 102a | Experiment 1 Variant 104a | Experiment 2 Variant 104b | Experiment 3 Variant 104c | Experiment 4 Variant 104d | Experiment 5 Variant 104e | Experiment 6 Variant 104f | Experiment 7 Variant 104g | Experiment 8 Variant 104h | Experiment 9 Variant 104i |
|---|---|---|---|---|---|---|---|---|---|

FIG. 3B

| Shared Control Pool 106a | Experiment 1 Variant 108a | Experiment 2 Variant 108b | Shared Control Pool 106a | Experiment 3 Variant 108c | Unused |

FIG. 3C

SHARED EXPERIMENT CONTROL

TECHNICAL FIELD

This application relates generally to A/B testing platforms and, more particularly, relates to defining measuring points in an A/B testing system.

BACKGROUND

A/B testing (also known as split testing or bucket testing) is a method of comparing two versions of a system against each other to determine which system performs better with respect to one or more selected metrics. A/B testing presents two or more variants of a system to a selection of users at random and statistical analysis is used to determine which variation performs better for a given system goal. In some instances, A/B testing is performed between a current production version of a system and a potential implantation of a system.

In order to determine system performance, A/B testing requires enrolling users in experiments and presenting different elements to those users. A user may be provided either a current version (control) or a variation of the current version (experimental) and the user engagement with each version is measured. The measurement can occur at one or more measurement points defined by the system. In some instances, the measurement points correspond to user interactions with the system. A predetermined number of users is required for comparison and testing purposes between the control and experimental versions.

SUMMARY OF THE INVENTION

In various embodiments, a system including a computing device is disclosed. The computing device configured to receive a request for a page from a plurality of user devices and assign each of the plurality of user devices to one of a shared control pool or one of a plurality of experiments for a first layer within the page. The shared control pool includes a first percentage of a total number of the plurality of user devices and each of the plurality of experiments includes an experimental percentage of a total number of the plurality of user devices. For each user device assigned to the shared control pool, a base version each element of the first layer is transmitted to the user device. For each user device assigned to a first experiment, a first variant element associated with the first experiment and a base version for each additional element of the first layer is transmitted to the user device. For each user device assigned to a second experiment, a second variant element associated with the second experiment and a base version for each additional element of the first layer is transmitted to the user device. For each of the plurality of user devices, at least one record indicative of one or more interactions that occur after transmission of the base version or first variant element is received. The one or more interactions of a first subset of user devices assigned to the shared control pool are compared with the one or more interactions of each user device assigned to the first experiment and the one or more interactions of a second subset of user devices assigned to the shared control pool is compared with the one or more interactions of each user device assigned to the second experiment.

In various embodiments, a non-transitory computer readable medium having instructions stored thereon is disclosed. The instructions, when executed by a processor, cause a device to perform operations including receiving a request for a page from a plurality of user devices. The page contains one or more elements in a first layer. The processor is further operated to assign each of the plurality of user devices to one of a shared control pool or one of a plurality of experiments for the first layer within the page. The shared control pool includes a first percentage of the plurality of user devices and each of the plurality of experiments includes an experimental percentage of the plurality of user devices. The processor is further operated to transmit the one or more elements contained in the page to each of the plurality of user devices. A base version of each of the one or more elements of the first layer is provided to each of the plurality of user devices assigned to the shared control pool, a first variant element associated with the first experiment and a base version for each of a remaining of the one or more elements of the first layer is provided to each of the plurality of user devices assigned to the first experiment, and a second variant element associated with the second experiment and a base version for each of the remaining of the one or more elements of the first layer is provided to each of the plurality of user devices assigned to the second experiment. The processor is further operated to receive at least one record indicative of one or more interactions that occur after transmission for each of the plurality of user devices. The processor is further operated to compare the one or more interactions of a first subset of user devices assigned to the shared control pool with the one or more interactions of each user device assigned to the first experiment and to compare the one or more interactions of a second subset of user devices assigned to the shared control pool with the one or more interactions of each user device assigned to the second experiment.

In various embodiments, a method is disclosed. The method includes the step of receiving a request for a page from a plurality of user devices. The page contains one or more elements in a first layer. Each of the plurality of user devices is assigned to one of a shared control pool or one of a plurality of experiments for the first layer within the page. The shared control pool includes a first percentage of the plurality of user devices and each of the plurality of experiments includes an experimental percentage of the plurality of user devices. The one or more elements contained in the page are transmitted to each of the plurality of user devices. A base version of each of the one or more elements of the first layer is provided to each of the plurality of user devices assigned to the shared control pool, a first variant element associated with the first experiment and a base version for each of a remaining of the one or more elements of the first layer is provided to each of the plurality of user devices assigned to the first experiment, and a second variant element associated with the second experiment and a base version for each of the remaining of the one or more elements of the first layer is provided to each of the plurality of user devices assigned to the second experiment. At least one record indicative of one or more interactions that occur after transmission is received for each of the plurality of user devices. The one or more interactions of a first subset of user devices assigned to the shared control pool is compared with the one or more interactions of each user device assigned to the first experiment and the one or more interactions of a second subset of user devices assigned to the shared control pool is compared with the one or more interactions of each user device assigned to the second experiment.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein:

FIG. 2 illustrates a network configured to provide A/B testing, in accordance with some embodiments.

FIG. 3A illustrates a traditional allocation of traffic by an A/B testing system on a single layer for five experiments each requiring a control group of 10% and a variant group of 10%.

FIG. 3B illustrates an allocation of traffic by an A/B testing system including a shared control group for nine experiments each requiring a control group of 10% and a variant group of 10%, in accordance with some embodiments.

FIG. 3C illustrates an allocation of traffic by an A/B testing system including a shared control group for three experiments each requiring variously sized control groups and variant groups, in accordance with some embodiments.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, systems and methods of an A/B testing system including a shared control pool are disclosed. The A/B testing system is configured to implement a plurality of experiments on at least one page (or interface element) of a provided network access interface. For each layer of the provided page, the A/B testing system generates a shared control pool for each layer of the page. The A/B testing system implements a variant group for each experiment associated with the selected layer. The shared control pool is configured to provide a control group for each of the experiments on a single layer such that additional experiments can be implemented per layer as compared to traditional AB testing allocation.

In some embodiments, a network access system is configured to identify user systems enrolled in the shared control pool for a layer and provide base elements for each element in the layer. The network access system is configured to receive a content request (such as a beacon or key) from a user system including at least one variable indicating the user system 24 is enrolled in an experiment. In some embodiments, the network interface system is configured to receive the content request and generate a cache key for use by a cache server. The network interface system generates the cache key by removing experimental variables indicative of a shared control group from the beacon or key prior to generating the cache key. In some embodiments, the cache server is configured to store a base element and each variant element for each layer contained in one or more pages.

Figure 1:
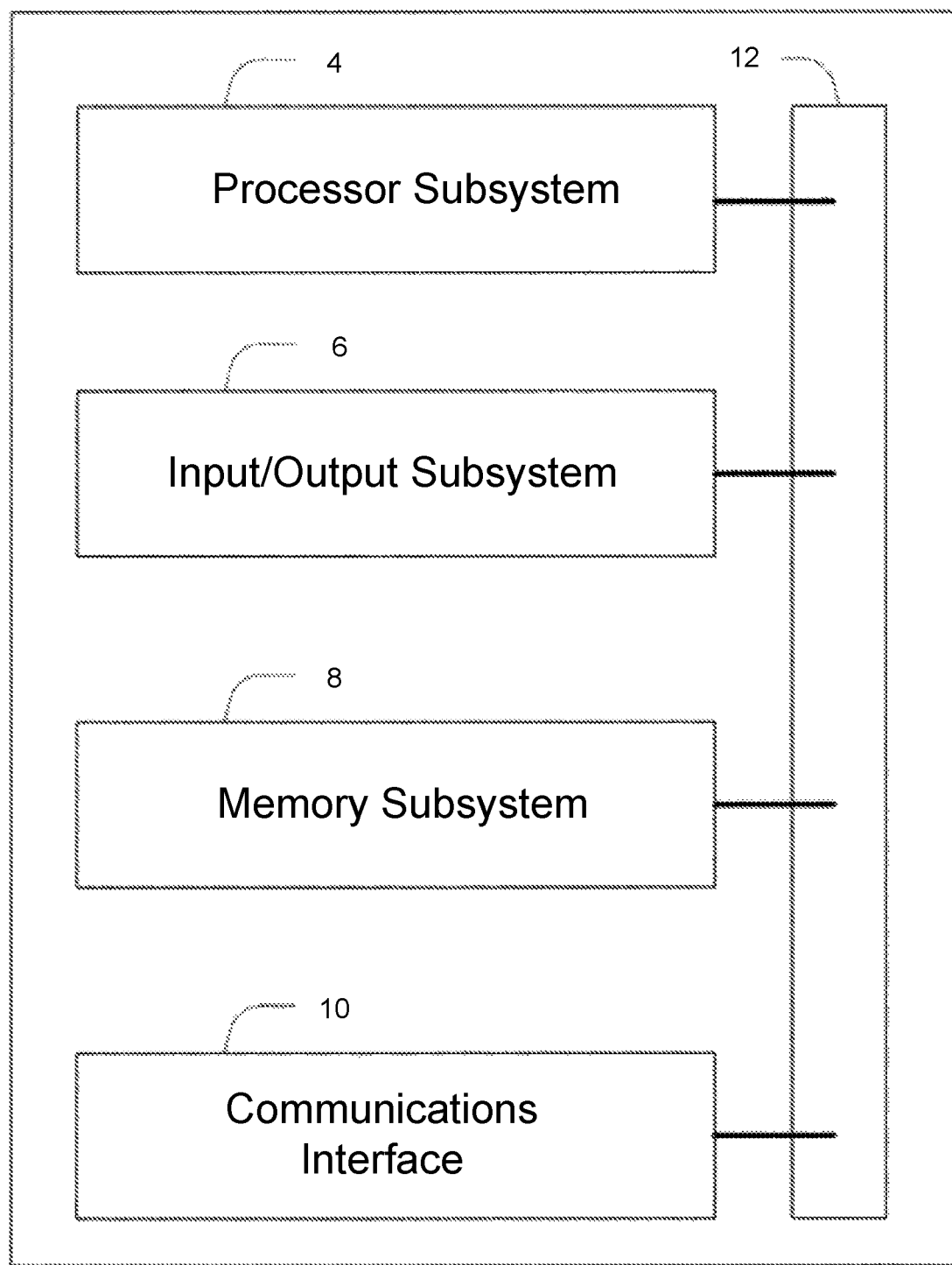
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 4 components may be combined or omitted such as, for example, not including a input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and smart measurement points, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

FIG. 2 illustrates a network 20 including a network access system 22, a first user system 24a, a second user system 24b, an A/B testing system 26, a query system 28, and a cache system 36. Each of the systems 22, 24a, 24b 26, 28, 36 can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, network access system 22, the A/B testing system 26, the query system 28, and/or the cache server 36 may be implemented by a shared server or shared network system. Similarly, the user systems 24a, 24b may be integrated into additional user systems, such as a networked system or server in a user environment. As used herein, the terms user system and user device are used interchangeably to refer to either a device associated with a specific user (such as a device having a specific "user ID" or "customer ID") and/or a specific device (Such as a device having a specific "device ID").

In some embodiments, the network access system 22 is configured to provide a network interface to each of the user systems 24a, 24b. For example, in some embodiments, the network access system 22 is configured to provide a webpage, web portal, and/or other network access interface to each of the user systems 24a, 24b. As one example, in some embodiments, the network access system 22 is configured to provide a webpage having an e-commerce interface for identifying and purchasing one or more goods, although it will be appreciated that the disclosed systems and methods can be applied to any suitable network access interface provided via a network to one or more systems. In some embodiments, the network access system 22 includes a front-end webserver, although it will be appreciated that the network access system 22 can include any suitable front-end system.

In some embodiments, the network access system 22 is configured to provide a network access interface including one or more pages. The term "page" is used herein to refer to specific portions of the network access interface, including, but not limited to, one or more static interfaces (e.g., webpages, files, etc.), one or more dynamic interfaces (e.g., graphical user interface, video interface, virtual reality interface, etc.), applications (e.g., mobile applications, desktop applications, etc.) and/or any other suitable interface. Each page includes one or more elements provided to a user system 24a, 24b, for example, for presentation to a user, for processing, etc. As used herein, the term "element" can refer to any content included in a page, including, but not limited to, presentation content (e.g., text, figures, backgrounds, colors, etc.), processing content (e.g., non-user visible code, executables, etc.), passive content (e.g., sensors, loggers, etc.), and/or any other suitable content.

In some embodiments, the AB testing system 26 is configured to implement one or more experiments. Experiments include variations of at least one element included in a page and are designed to assess one or more metrics with respect to a variant element. For example, in some embodiments, a page can include a base (or control) element or at least one variant of the element. The variant element alters at least one user presentation and/or interaction with the page. For example, in various embodiments, a variant element can include variant content (e.g., variant banners, images, text, colors, etc.), variant positions, variant responses, etc. as compared to a base element. When a user system 24a, 24b connects to the A/B testing system 26, the user system 24a, 24b is randomly assigned to one or more experiments for each page included in the network interface. For each experiment, a user system 24a, 24b is designated as being in either a control group (i.e., receiving the base element) or a variant group (i.e., receiving a variant element). Interactions between the user systems 24a, 24b and the network access system 22 can be analyzed to determine whether a variant element increases one or more desired metrics. Desired metrics can include domain specific metrics. For example, metrics in an e-commerce environment may include engagement time, completion percentage, processing time, and/or any other suitable e-commerce metric.

In some embodiments, the A/B testing system 26 implements multiple experiments per page. Multiple experiments on a single page may alter the same and/or different elements presented on the page. Experiments that provide variant elements for the same element and/or that make non-compatible changes are considered mutually exclusive (i.e., the experiments cannot or should not be presented together). Mutually exclusive variant elements are positioned within a single "layer" of the page such that each "layer" includes elements of mutually exclusive experiments. For example, in some embodiments, the A/B testing system 26 includes a first base element, a first experiment including a first variant element that modifies the first base element, and a second experiment including a second variant element that modifies the first base element. Because both the first variant element and the second variant element modify the first base element, the first variant element and the second variant element cannot be utilized simultaneously and the first experiment and the second experiment are mutually exclusive with each other (and with the base element). Mutually exclusivity of two or more elements is enforced by configuring mutually exclusive variant elements in the same layer in the A/B testing system 26.

Experiments that are not mutually exclusive (i.e., include variant elements that are compatible or can be presented together) are included on separate layers and can be presented simultaneously to a user. For example, in some embodiments, a user system 24a, 24b can be assigned to, at most, one experiment per layer for two or more layers maintained by the A/B testing system 26, such as a first layer and a second layer. Each of the user systems 24a, 24b can receive a page including a control element or a single variant element for the first layer and a control element or a single variant element for the second layer. The network access interface can include any number of layers defining any number of mutually exclusive elements and/or variants.

When a user system 24a, 24b interacts with the network access system 22 portion, the A/B testing system 26 automatically enrolls the user system 24a, 24b in one or more experiments (with at most one experiment per layer). Within each experiment, the user system 24a, 24b is assigned to a control group or a variant group for each enrolled experiment. The user may be enrolled in one experiment per layer per page (e.g., each of one mutually exclusive variant can be selected). For example, in embodiments including an e-commerce interface, each presented page of the e-commerce network can contain multiple layers each having one or more experiments. When a user system 24a, 24b interacts with a specific webpage, the A/B testing system 26 provides the selected control or variant element for each layer contained within the selected webpage. For example, in one embodiment, a page may contain a first control element or a first variant element contained in a first layer and a second control element or a second variant element contained in a second layer of the page.

As another example, in one embodiment including a page having a single experiment including a single variant element, each of the user systems 24a, 24b that interacts with the page and that is assigned to the experiment is provided either a version of the page containing the base element or a version of the page containing the variant element. Various iterations may result in the following assignments: first user system 24a assigned to base element, second user system 24b assigned to variant element; first user system 24a assigned to variant element, second user system 24b assigned to base element; each of the first user system 24a and the second user system 24b are assigned to the base element; or each of the first user system 24a and the second user system 24b are assigned to the variant element. Additional user systems (not shown) and/or additional experiments (in the same or different layers) exponentially increase the potential number of iterations that are possible for assignment and presentation to user systems 24a, 24b.

Each interaction between a user system 24a, 24b and the network access system 22 includes a data exchange. In some embodiments, each data exchange includes an identifier generated by the user system 24a, 24b and/or the network system 22 that provides information regarding the interaction, for example, identifiers regarding which pages (or other elements) of the network access system 22 were accessed/requested by the user system 24a, 24b. The user identifier may be generated by the user system (e.g., a beacon, a cookie, etc.), generated by the network access system (e.g., a log, a cookie, a cache key, etc.), sensor data, etc. (collectively referred to herein as records).

In some embodiments, a record includes one or more elements related to and/or indicative of interactions between the user system 24a, 24b and the network access system 22. For example, in some embodiments, a first variable includes a value indicating that a user system 24a interacted with a first page. The value may be any suitably unique identifier that associates the user system 24a with the page. Because the user system 24a interacted with a page, the user system is qualified to be included in analysis of any experiments presented on that page and for which the user system 24a is enrolled.

As another example, in some embodiments, a record includes a variable indicative of an interaction between a user system 24a and a specific element presented by the network access system 22. For example, in some embodiments, a variable may be generated by interactions with an element and have a first value for interactions with a control element and a second value for interactions with a variant element. Because the user system 24a interacted with an element having one or more potential variants, the user system 24a is qualified to be included in analysis only for the experiment including that element. Although specific embodiments are discussed herein, it will be appreciated that records can include multiple elements (or identifiers) relating to interactions between a user system 24a, 24b and the network access system 22 that may be used to qualify a user system 24a, 24b for inclusion in an experiment.

In some embodiments, one or more values stored in the record are generated based on and/or provided by a identifier stored on the user system 24a, 24b by the network access system 22 (such as a cookie). For example, in some embodiments, the identifier contains variables for base and/or variant elements for experiments in which the user system 24a, 24b is assigned. When the user system 24a, 24b requests a page corresponding to the experiment, the identifier provides the values identifying the base or variant element to be provided by the network access system 22 to the user system 24a, 24b. In other embodiments, the identifier includes an experiment variable indicating that the user system 24a, 24b has been assigned to an experiment and relies on the network access system 22 to select the correct base or variant element for presentation to the user system 24a, 24b.

In some embodiments, a user system 24a, 24b is assigned in one or more experiments during an initial interaction between the user system 24a, 24b and the network access system 22 and the network access system 22 generates an identifier for transmittal to and/or storage on the user system 24a, 24b. In some embodiments, the identifier includes a variable for each of the experiments in which the user system 24a, 24b is currently assigned. In other embodiments, identifiers are generated for each page containing one or more experiments when a user device 24a, 24b initially interacts with that page. It will be appreciated that any suitable identifier, including a user-generated identifier, system-generated identifier, universal identifier, etc. can be used.

The user system 24a, 24b interacts with a page (or other interface element) provided by the network access system 22 to perform one or more operations. For example, typical interactions in an e-commerce network access system 22 include, but are not limited to, identifying product categories or search terms of interest, selecting one or more items for inclusion in a user cart, performing a check-out operation, creating a user account, etc. When a user system 24a, 24b interacts with a page containing an experiment, subsequent interactions between the user system 24a, 24b and the network access system 22 can be analyzed to determine the effectiveness of the variant element included in the experiment. If a user system 24a, 24b interacts with a page including an experiment and the user system 24a, 24b is provided either a base element or the variant element associated with the experiment, the user system 24a, 24b is considered "qualified" to be included in analysis of the experiment presented on the page.

For example, in some embodiments, a network access system 22 is configured to provide a webpage which can potentially contain two variant elements. A first user system 24a interacts with a first version of the webpage containing the first base element and a second user system 24b interacts with a second version of the webpage containing a first variant element. The subsequent interactions between the first user system 24a and the network access system 22 can be compared to the subsequent interactions between the second user system 24b and the network access system 22 to determine the effectiveness of the first variant element as compared to the base element. A user system 24a, 24b that interacts with a page potentially containing a variant element is "qualified" for inclusion in analysis of any variant element presented on the page. In order to analyze the effectiveness of variant elements, user systems 24a, 24b which interact with pages or other elements of the network access system 22 potentially containing variant elements must be identified.

In some embodiments, the A/B testing system 26 is configured to receive queries and/or analytic requests from one or more query systems 28. The query systems 28 can include a system 2 as described above with respect to FIG. 1, and similar description is not repeated herein. In some embodiments, the query system 28 is associated with the same entity and/or organization that provides the network access system 22. The query system 28 is configured to generate one or more analytical queries regarding interactions between the network access system 22 and the user systems 24a, 24b. In some embodiments, the query system 28 is configured to evaluate one or more experiments implemented by the A/B testing system 22 by comparing interactions between the network access system 22 and user systems 24a, 24b including one or more variant elements. The query system 28 is configured to identify one or more metrics for analyzing interactions. For example, in an e-commerce embodiment, the query system 28 can be configured to analyze whether a product was added to a cart, whether the product was purchased, whether a loyalty program was used, etc. It will be appreciated that any suitable metrics can be defined for any environment presented by the network access system 22.

In some embodiments, the A/B testing system 26 assigns a predetermined percentage of user systems 24a, 24b to each experiment per layer. In traditional A/B testing systems, each experiment on a specific level requires a portion of the total traffic for a control group (e.g., systems not receiving a variant element for the experiment) and a portion of the total traffic for each variant element presented by the experiment. For example, in some embodiments, the A/B testing system 26 is configured to assign 10% of traffic (e.g., 10% of the user systems 24a, 24b that interact with the network access system 22) to a control group and an additional 10% of traffic to a variant group for each experiment implemented by an A/B testing system 26, requiring a total of 20% of the traffic received by network access system 22 to be devoted to a single experiment per layer.

Because each experiment requires a control group and at least one variant group, the number of experiments that can be implemented on a single layer is limited. For example, as shown in FIG. 3A, in embodiments having experiments each requiring 10% of traffic for a control group and 10% of traffic for a variant group, each layer can implement up to a maximum of 5 experiments, each having a control pool 102a-102e of 10% and a variant pool 104a-104e of 10%. Although the percentage of traffic devoted to each experiment may be reduced to allow additional experiments, a meaningful sample size must be devoted to each experiment to provide statistically significant results. Therefore, a maximum number of experiments exists equal 100/X, where X is the sum of the statistically significant sample size for each experiment (e.g., the minimum size for the control group plus the minimum size for the variant group for each experiment) that may be implemented.

In order to allow additional experiments to be implemented per layer, the disclosed embodiments implement a shared control pool. A shared control pool allows each experiment implemented by the A/B testing system 26 to share a predetermined control group of user systems 24a, 24b for comparison to variant elements. Each system 24a, 24b in the shared control pool is presented with a page without any variant elements for the related layer, e.g., for each experiment implemented by the A/B testing system 26, the shared control pool is provided with the base element is provided.

For example, as shown in FIG. 3B, the A/B testing system 26 can enroll a predetermined amount of traffic, such as 10% of traffic, to a shared control pool 106. When an experiment is implemented on a layer, the A/B testing system 26 implements a variant group 104a-104i for each experiment included in a layer, but does not implement an experiment specific control group. Instead, each experiment on a shared layer utilizes a subset of the predetermined control pool 106 as a control group during analysis of the experiment. In some embodiments, a control subset utilized for a first experiment may overlap with a control subset utilized by one or more additional experiments implemented on a shared layer by the A/B testing system 26. As shown in FIG. 3B, implementation of a shared control group 106 increases the number of experiments that can be implemented by the A/B testing system 26 on a single layer. For example, in the illustrated embodiment, an additional four experiments (for a total of nine) can be implemented using a shared control group 106, as compared to traditional system illustrated in FIG. 3A. Although the size of the shared control group 106 and the size of each of the variant groups 104a-104i determines the total number of experiments that can be implemented on a single layer, a shared control group 106 allows a greater number of experiments to be implemented.

In some embodiments, the shared control group 106a is equal to the largest control group required by any one of the implemented experiments. For example, in one embodiment shown in FIG. 3C, the A/B testing system 26 implements a first experiment requiring a control group and a variant group each containing 20% of total traffic and a second experiment requiring a control group and a variant group each containing 5% of total traffic. In a traditional A/B testing system, allocation for each of these experiments would require 50% of total traffic (20% for control group for first experiment+20% for variant group for first experiment+5% for control group for second experiment+5% for variant group for second experiment). As shown in FIG. 3C, the shared control pool 106a containing 20% of total traffic can be implemented by the A/B testing system 26 and used for both the first experiment and the second experiment.

When performing analysis of the first experiment and/or the second experiment, a subset of the shared control group 106a is used as a basis of comparison with respect to the variant group 108*a*, 108*b*. For example, during analysis of the first experiment, the entire shared control pool 106*a* is utilized (i.e., the entire 20% of traffic is included as the control group for the first experiment). However, during analysis of the second experiment, only 5% of traffic is required, and therefore only ¼ of the shared control pool 106*a* (i.e., 5% of traffic) is used as a control group. The selected ¼ of the shared control pool 106*a* overlaps with the subset of the shared control pool 106*a* used by the first experiment. However, the use of the shared control pool 106*a* does not impact the analysis of either experiment. It will be appreciated that the subset of the shared control pool 106*a* used by the second experiment can be selected based on a predetermined algorithm (e.g., the first x % of the shared control pool 106*a*) or randomly selected from the shared control pool 106*a*.

In some embodiments, allocation of user traffic to the shared control group 106*a* and/or the variant groups 108*a*, 108*b* can be assigned by buckets. For example, each layer presented on a page (or other interface element) can contain a predetermined number of buckets, such as 1000 buckets, although it will be appreciated that any suitable number of buckets can be used. Each bucket represents a percentage of the total traffic to the network interface system 22. In the above example, each of the 1000 buckets represents 0.1% of total traffic received by the network interface system 22.

Each of the buckets may be enrolled in one of a shared control pool 106*a* or a variant group 108*a*, 108*b*. When an experiment is defined by the A/B testing system 26, a user can select a number of buckets (or a percentage of total buckets) to assign to a variant group 108*a* and can also indicate the required size of the control group for the experiment. The A/B testing system 26 may be configured to allocate a predetermined number of buckets to a shared control pool 106*a* and/or may be configured to allocate a number of buckets based on the defined experiments. For example, in some embodiments, the A/B testing system 26 is configured to review each experiment defined for a layer and identify the experiment having the largest required control group. The A/B testing system 26 assigns a number of buckets (or percentage of buckets) to the shared control pool 106*a* equal to or greater than the largest required control group for that layer. In embodiments including a static sized shared control pool 106*a*, the A/B testing system 26 may limit experiments for that layer to groups (either control or variant) equal to or less than the size of the shared control group 106*a*. Within each layer, a bucket can be assigned to the shared control pool 106*a* or one of the experiment groups 108*a*, 108*b* implemented on that layer.

In some embodiments, when a bucket is assigned to the shared control pool 106*a* or a variant pool 108*a*, 108*b*, the designation is maintained through all iterations of the respective layer. For example, in some embodiments, the A/B testing system 26 enrolls a predetermined percentage of buckets to the shared control pool 106*a* as an initial allocation at time $t_0$. The percentage may be selected according to any of the methods discussed above. In the illustrated embodiment, the A/B testing system 26 allocates the first 20% (e.g., 1-20%) to the shared control pool 106*a*. A first experiment is defined by the A/B testing system 26 and requests 20% of the total buckets for a first variant group 108*a*. The A/B testing system 26 allocates the next 20% of the total buckets (e.g., 21-40%) of the total buckets to the first variant group 108*a*. A second experiment is defined by the A/B testing system 26 and requests 5% of the total buckets for a second variant group 108*b*. The A/B testing system 26 allocates the next 5% (e.g., 41-45%) of the total buckets to the second variant group 108*b*. Although the percentages and bucket sets for each group 106*a*, 108*a*, 108*b* are illustrated as being sequential, it will be appreciated that the actual buckets allocated for each group may be randomly selected from an available pool of buckets and/or selected according to any other selection criteria.

At a later time $t_1$, a third experiment is added to the A/B testing system 26. The third experiment indicates that a control group of at least 30% and a variant group of at least 30% is required for the experiment. The A/B testing system 26 determines that 20% of the total buckets have already been allocated to a shared control pool 106*a* and allocates an additional 10% of the total buckets to the shared control pool 106*a*. The 10% of buckets added to the shared control pool 106*a* is the next 10% occurring after the second variant group 108*b* (e.g., 46-55%). The A/B testing system 26 then allocates the next 30% (e.g., 56-86%) of the total buckets to a third variant group 108*c*. In some embodiments, the A/B testing system 26 maintains the already assigned buckets and can add and/or remove buckets to free blocks without re-distributing each of the buckets. In other embodiment, the A/B testing system 26 may be redistribute buckets at predetermined times and/or when experiments are added to a layer.

As discussed above, in some embodiments, the network access system 22 generates one or more identifiers that are stored on a user system 24*a*, 24*b* and used to generate beacons during interactions between the network access system 22 and the user systems 24*a*, 24*b*. In some embodiments including a shared control pool 106, each user system 24*a*, 24*b* assigned to the shared control pool 106 receives an identifier indicating membership in the shared control pool 106 and indicating that the base version of each element in the layer should be provided. Although such embodiments allow for easy designation of user systems 24*a*, 24*b* in the shared control group, the use of a single value for the shared control pool 106 in the identifier can present reporting and analytic issues when performing experimental analysis.

To overcome the above drawbacks, in some embodiments, the network access system 22 is configured to generate an identifier including a variable indicative of each experiment that the user system 24*a*, 24*b* is enrolled in. For example, in some embodiments, when a user system 24*a* interacts with the network access system 22, the user system 24*a* is enrolled in one or more of the experiments currently implemented by the AB testing system 26. The user system 24*a* is enrolled in experiments based on the percentage of traffic required by the experiment, the number of user systems previously assigned to the experiment, and the total number of user systems interacting with the network access interface 22. In some embodiments, the user system 24*a* is enrolled in experiments prior to interacting with (or qualifying for) those experiments.

When the network access system 22 generates an identifier for the user system 24*a*, the identifier includes a variable for each experiment in which the user system 24*a* is enrolled. In some embodiments, the experiment variable also includes a value indicating the group selected for the user system 24*a*, e.g., control group, variant group, etc. Alternatively, if the user system 24*a* is assigned to the shared control group 106 (and therefore not receiving any variant elements), the identifier includes a value related to the shared control pool 106. In some embodiments, the experiment variable includes an empty value when the user system 24*a* is assigned to the shared control pool 106. In other embodiments, the experiment identifier includes a value specifically indicating enrollment in the shared control pool 106.

In some embodiments, the use of a shared control pool 106 provides for a reduction in edge caching for the network access system 22. Edge caching refers to the use of caching servers to store content closer to user systems 24a, 24b in a network architecture. For example, if the network access system 22 is configured to provide an e-commerce site, static or commonly shared elements of the e-commerce site may be stored at a caching server. When a user system 24a, 24b accesses the network access system 22, the caching server provides the common content directly without having to use other system resources, such as a web server, database calls, etc., within the network system 22. Caching increases responsiveness and decreases latency for the network access system 22.

In embodiments including an AB testing system 26, the caching server 36 is configured to store cached copies of each variant element or page provided by the network access system 22. When a user system 24a requests access to a page, the network access system 22 identifies the base or variant element required (based on the identifier provided from the user system 24a) and the caching server provides the element to the user system 24a. In traditional systems, for each assigned experiment, the caching server 36 must maintain a cached copy of a base element and a cached copy of a variant element, resulting in multiple copies of the base element being stored. In systems including a shared control group, the cache server 36 can maintain a single cached base element and a cached copy of each variant element for each experiment. By caching only a single shared base element, the cache server 36 can reduce the amount of memory required for storing cached versions of an element, layer, or page.

Figure 4:
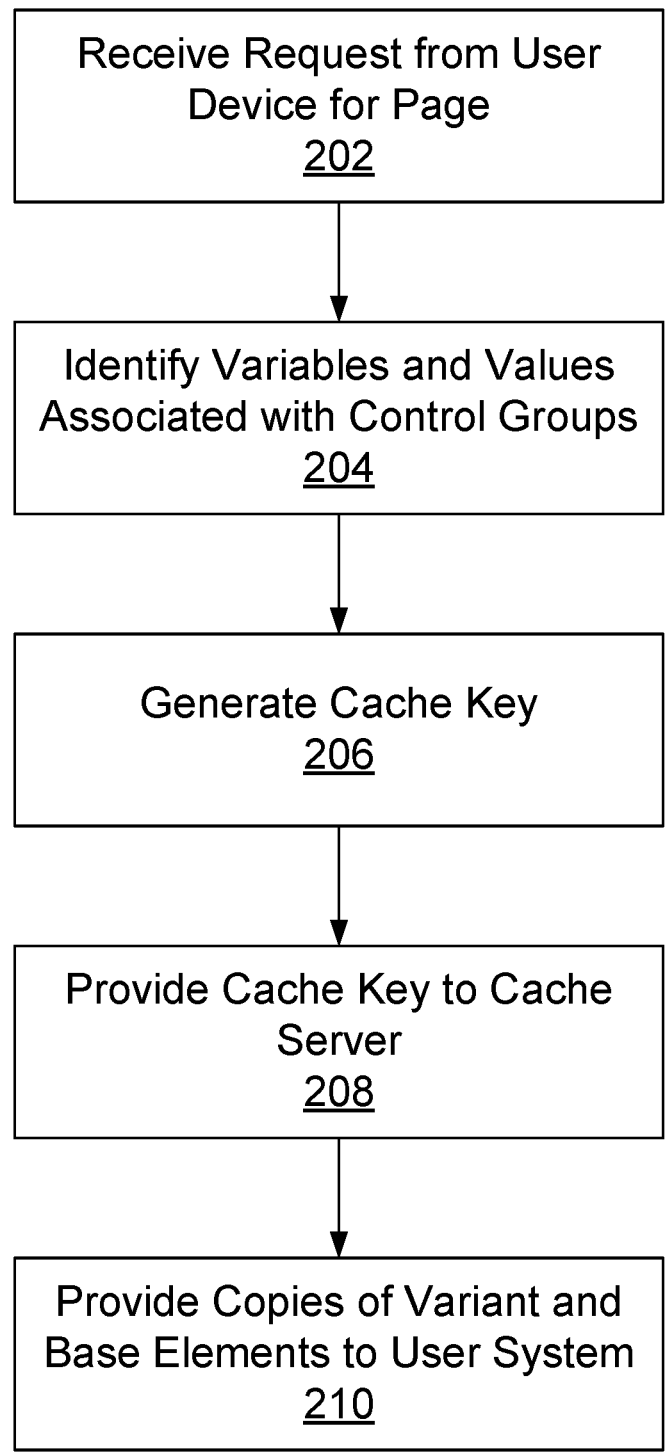
FIG. 4 illustrates a method of providing cached versions of a page having one or more experiments maintained by an A/B testing system including a shared control pool, in accordance with some embodiments.

FIG. 4 is a flowchart illustrating a method 200 of providing base elements to each user system enrolled in the shared control pool 106, in accordance with some embodiments. At step 202, the network system 22 receives a request from a user device 24a for a specific page or other interface element. The request includes an identifier (e.g., a cookie, beacon, etc.) containing one or more experimental variables indicating that the user device 24a has been assigned to a control group for at least one experiment on a requested page.

At step 204, the network system 22 is configured to identify variable and/or values associated with experimental control groups contained within the identifier. For example, in some embodiments, the network system 22 is configured to identify experimental variables containing a value indicative of a control group of the experiment (such as an empty value or a predetermined value associated with the experimental control group).

At step 206, the network interface system 22 is configured to generate a cache key containing only experiment variables associated with variant groups. For example, in some embodiments, the network interface system 22 is configured to generate a second, or cache, identifier identical to the original identifier with any experimental identifiers identifying a shared control group having been removed and generates a cache key based on the second identifier. As another example, in some embodiments, the network interface server 22 generates a cache key directly by ignoring the experiment variables indicative of a control group in the identifier. In some embodiments, the AB testing system 26 maintains a list of variable values indicative of a control group and is configured to remove and/or ignore each variable containing a value stored in the list.

The generated cache key contains values only for variant elements. That is, for layers in which the user system 24a is enrolled in the shared control pool, the cache key does not contain a key identifier for that layer. By removing experimental variables pointing to control groups, the length of a cache key can be significantly shortened. In addition, the number of cached elements that need to be maintained by the cache server 36 is significantly reduced, as only a single base version and the variant versions of each element for each layer needs to be maintained by the cache server 36.

At step 208, the cache key is provided to the cache server 36 and, at step 210, the cache server provides copies of each element within a requested page. If the cache key includes an experimental variable associated with an element, the cache server is configured to provide the variant element identified in the experimental variable. If the cache key lacks an experimental variable for a specific element, the cache server 36 is configured to provide the base version of the element.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
a memory having instructions stored thereon, and a processor configured to read the instructions to:
receive a request for a page from a plurality of user devices;
assign each of the plurality of user devices to one of a shared control pool or one of a plurality of experiments for a first layer within the page, wherein the shared control pool includes a first percentage of a total number of the plurality of user devices and each of the plurality of experiments includes an experimental percentage of a total number of the plurality of user devices;
for each user device assigned to the shared control pool, transmit a base version of each element of the first layer to the user device;
for each user device assigned to a first experiment, transmit a first variant element associated with the first experiment and a base version for each additional element of the first layer to the user device;
for each user device assigned to a second experiment, transmit a second variant element associated with the second experiment and a base version for each additional element of the first layer to the user device;
receive, for each of the plurality of user devices, at least one record indicative of one or more interactions that occur after transmission of the base version or first variant element;
compare the one or more interactions of a first subset of user devices assigned to the shared control pool with the one or more interactions of each user device assigned to the first experiment; and compare the one or more interactions of a second subset of user devices assigned to the shared control pool with the one or more interactions of each user device assigned to the second experiment.

2. The system of claim 1, wherein the first subset of user devices assigned to the shared control group includes a first percentage of a total number of users assigned to the shared control group and the second subset of user devices assigned to the shared control group includes a second percentage of a total number of users assigned to the shared control group, wherein the first percentage and the second percentage are different.

3. The system of claim 1, wherein at least one user device is included in each of the first subset of user devices assigned to the shared control group and the second subset of user devices assigned to the shared control group.

4. The system of claim 1, wherein the page includes a second layer and each of the plurality of user devices is assigned to one of a shared control pool or one of a plurality of experiments for the second layer.

5. The system of claim 4, wherein at least one user device is assigned to the shared control pool of the first layer and at least one experiment of the second layer.

6. The system of claim 1, wherein the request for the page from each of the plurality of user devices includes an experimental variable, wherein the experimental variable is indicative of the assignment of a selected user device to the shared control pool or one of the plurality of experiments.

7. The system of claim 6, wherein the processor is further configured to:

generate a cache key for transmittal to a cache server, wherein:

for each user device assigned to the first experiment, the cache key includes a variable indicative of the first variant element;

for each user devices assigned to the second experiment, the cache key includes a variable indicative of the second variant element; and for each user device assigned to the shared control pool, the cache key does not include a variable for the first layer.

8. The system of claim 1, wherein the first percentage of the total number of user devices assigned to the shared control group is equal to a largest of the experimental percentages.

9. A non-transitory computer readable medium having instructions stored thereon, wherein the instructions, when executed by a processor cause a device to perform operations comprising:

receiving a request for a page from a plurality of user devices, wherein the page contains one or more elements in a first layer;

assigning each of the plurality of user devices to one of a shared control pool or one of a plurality of experiments for the first layer within the page, wherein the shared control pool includes a first percentage of the plurality of user devices and each of the plurality of experiments includes an experimental percentage of the plurality of user devices;

transmitting the one or more elements contained in the page to each of the plurality of user devices, wherein a base version of each of the one or more elements of the first layer is provided to each of the plurality of user devices assigned to the shared control pool, a first variant element associated with the first experiment and a base version for each of a remaining of the one or more elements of the first layer is provided to each of the plurality of user devices assigned to the first experiment, and a second variant element associated with the second experiment and a base version for each of the remaining of the one or more elements of the first layer is provided to each of the plurality of user devices assigned to the second experiment;

receiving, for each of the plurality of user devices, at least one record indicative of one or more interactions that occur after the transmission;

comparing the one or more interactions of a first subset of user devices assigned to the shared control pool with the one or more interactions of each user device assigned to the first experiment; and comparing the one or more interactions of a second subset of user devices assigned to the shared control pool with the one or more interactions of each user device assigned to the second experiment.

10. The non-transitory computer readable medium of claim 9, wherein the first subset of user devices assigned to the shared control group includes a first percentage of a total number of users assigned to the shared control group and the second subset of user devices assigned to the shared control group includes a second percentage of a total number of users assigned to the shared control group, wherein the first percentage and the second percentage are different.

11. The non-transitory computer readable medium of claim 9, wherein at least one user device is included in each of the first subset of user devices assigned to the shared control group and the second subset of user devices assigned to the shared control group.

12. The non-transitory computer readable medium of claim 9, wherein the page includes a second layer and each of the plurality of user devices is assigned to one of a shared control pool or one of a plurality of experiments for the second layer.

13. The non-transitory computer readable medium of claim 12, wherein at least one user device is assigned to the shared control pool of the first layer and at least one experiment of the second layer.

14. The non-transitory computer readable medium of claim 9, wherein the request for the page from each of the plurality of user devices includes an experimental variable, wherein the experimental variable is indicative of the assignment of a selected user device to the shared control pool or one of the plurality of experiments.

15. The non-transitory computer readable medium of claim 14, wherein the instructions, when executed by the processor cause the device to perform further operations comprising:

generating a cache key for transmittal to a cache server, wherein:

for each user device assigned to the first experiment, the cache key includes a variable indicative of the first variant element;

for each user devices assigned to the second experiment, the cache key includes a variable indicative of the second variant element; and for each user device assigned to the shared control pool, the cache key does not include a variable for the first layer.

16. The non-transitory computer readable medium of claim 9, wherein the first percentage of the total number of user devices assigned to the shared control group is equal to a largest of the experimental percentages.

17. A method, comprising:
receiving a request for a page from a plurality of user devices, wherein the page contains one or more elements in a first layer;
assigning each of the plurality of user devices to one of a shared control pool or one of a plurality of experiments for the first layer within the page, wherein the shared control pool includes a first percentage of the plurality of user devices and each of the plurality of experiments includes an experimental percentage of the plurality of user devices;
transmitting the one or more elements contained in the page to each of the plurality of user devices, wherein a base version of each of the one or more elements of the first layer is provided to each of the plurality of user devices assigned to the shared control pool, a first variant element associated with the first experiment and a base version for each of a remaining of the one or more elements of the first layer is provided to each of the plurality of user devices assigned to the first experiment, and a second variant element associated with the second experiment and a base version for each of the remaining of the one or more elements of the first layer is provided to each of the plurality of user devices assigned to the second experiment;
receiving, for each of the plurality of user devices, at least one record indicative of one or more interactions that occur after the transmission;
comparing the one or more interactions of a first subset of user devices assigned to the shared control pool with the one or more interactions of each user device assigned to the first experiment; and
comparing the one or more interactions of a second subset of user devices assigned to the shared control pool with the one or more interactions of each user device assigned to the second experiment.

18. The method of claim 17, wherein the first subset of user devices assigned to the shared control group includes a first percentage of a total number of users assigned to the shared control group and the second subset of user devices assigned to the shared control group includes a second percentage of a total number of users assigned to the shared control group, wherein the first percentage and the second percentage are different.

19. The method of claim 17, wherein the page includes a second layer and each of the plurality of user devices is assigned to one of a shared control pool or one of a plurality of experiments for the second layer.

20. The method of claim 17, wherein the first percentage of the total number of user devices assigned to the shared control group is equal to a largest of the experimental percentages.

* * * * *